Patented Oct. 4, 1949

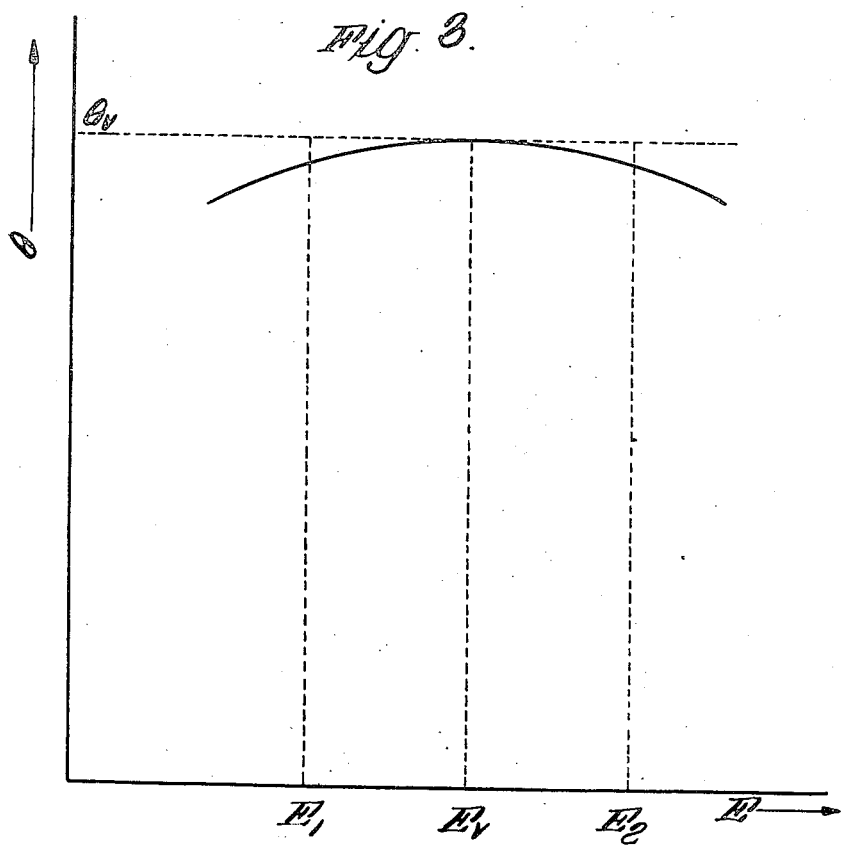

2,483,757

UNITED STATES PATENT OFFICE 2,483,757

TEMPERATURE COMPENSATOR FOR ELECTRICAL MEASURING SYSTEMS

Alexander Constantine Denisoff, East Twickenham, England, assignor to West Road Co. Limited Application April 23, 1946, Serial No. 664,399
In Great Britain May 1, 1945

5 Claims. (Cl. 171—95)

This invention relates to electrical measuring systems employing moving coil indicating instruments such as voltmeters, ammeters, ohmmeters and the like.

In some applications of electrical measuring systems, e. g. on aircraft, the apparatus is exposed to wide fluctuations in ambient temperature and compensation has to be provided for the change in electrical resistance of the component parts due to such temperature changes if the accuracy of measurement is to be preserved. In particular it is necessary to compensate for the variations in resistance of the moving coil of the indicating instrument which normally is wound of copper wire.

It is known to reduce such variation by connecting in series with the moving coil a resistance of negligible temperature coefficient of resistance and of such magnitude as to swamp the variations in resistance of the coil. Such an arrangement however results in a considerable loss in sensitivity.

It is an object of the present invention to provide a novel and efficient circuit arrangement for compensating for changes in resistance of a moving coil indicating instrument due to changes in temperature.

A further object of the invention is to provide a temperature compensated ammeter.

A still further object of this invention is to provide an electrical resistance thermometer which is fully temperature compensated.

Other objects and advantages of the present invention will become apparent during the course of the following description with reference to the drawings in which—

Fig. 3 illustrates the form of compensation given by a particular kind of ohmmeter for voltage variations.

Figure 1:
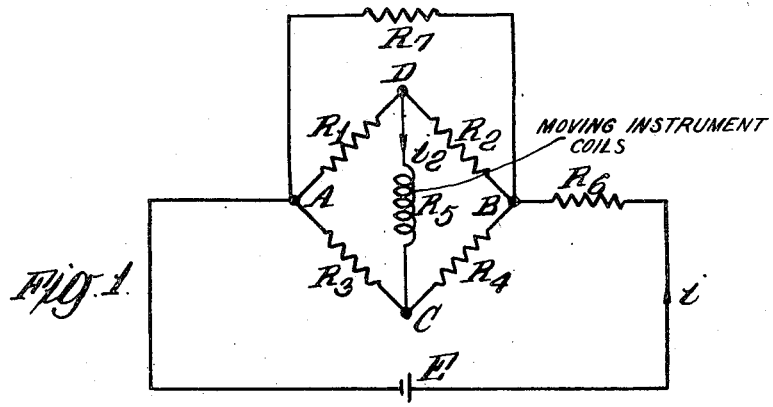
Fig. 1 is a wiring diagram of a compensating circuit in accordance with the invention.

Referring now to Fig. 1, which shows a wiring diagram of a compensating circuit including a moving coil indicating instrument, the coil $R_5$ of the instrument is connected in one diagonal arm CD of a bridge made up of four resistances $R_1$, $R_2$, $R_3$ and $R_4$. Connected between the terminals AB of the bridge is a resistance $R_7$ and also connected between these terminals is a source of potential E and a further resistance $R_6$ in series. Ignoring the resistances $R_6$ and $R_7$ it will be appreciated that in this arrangement even if the resistances $R_1$—$R_4$ have a zero temperature coefficient of resistance the indications of the instrument will be affected by temperature changes since the resistance of the coil $R_5$, which may be wound of copper wire, will depend on temperature.

It may be shown however that the over-all temperature coefficient of the system, illustrated in Fig. 1, may be reduced substantially to zero by a correct selection of the values and temperature coefficients of $R_6$ and $R_7$.

Considering the network of resistances $R_1$ to $R_7$:

Let $r_1$ and $r_2$ be the bridge resistances across A, B, and C, D, respectively, when the moving coil resistance $R_5$ is infinite, and let $$R_1+R_2+R_3+R_4=R$$

then $$r_1=\frac{(R_1+R_2)(R_3+R_4)}{R}$$

and $$r_2=\frac{(R_1+R_3)(R_2+R_4)}{R}$$

When the bridge is balanced, i. e. when the moving coil current $i_2=0$, then the bridge resistance across A, B, is equal to $r_1$, and we may assume that, for small moving coil currents, any finite value of the moving coil resistance $R_5$ does not affect the bridge resistance, so that to the first order of approximation we may take the resistance between A and B as $r_1$.

It can be shown from bridge circuit theory that the moving coil current $i_2$ is expressed as a function of the battery current $i$ by means of the relation $$i_2=\frac{(R_2R_3-R_4R_1)}{r_2R}\cdot\frac{1}{\left(1+\frac{R_5}{r_2}\right)\left(1+\frac{r_1}{R_7}\right)}\cdot i$$

and as a function of the battery voltage E, by means of the relation $$i_2=\frac{(R_2R_3-R_4R_1)}{r_1R}\cdot\frac{1}{\left(1+\frac{R_5}{r_2}\right)\left(1+\frac{R_6}{r_1}+\frac{R_6}{R_7}\right)}\cdot E$$

These two expressions for $i_2$ are correct, to the first order of approximation, for small values of $i_2$, that is, for $i_2 \ll i$.

It is desired to compensate the current $i_2$ through the moving coil resistance $R_5$ for changes in the value of $R_5$ with temperature by a suitable choice of the values and temperature coefficients of $R_6$ and $R_7$.

Let us denote $$\left(1+\frac{R_5}{r_2}\right)\left(1+\frac{R_6}{r_1}+\frac{R_6}{R_7}\right)=f$$

so that $$i_2=\left(\frac{R_2R_3-R_4R_1}{r_1R}\right)E\cdot\frac{1}{f}$$

Now, $f$ is the only temperature variable factor in the expression for the moving coil current $i_2$, so that we may consider the variation of $f$ alone. Since temperature variations of $R_6$ will act in the same direction as those of $R_5$ we may choose $R_6$ to have a zero temperature coefficient, and we may note that temperature variations of $R_7$ are in the opposite direction to those of $R_5$, and thus, will give the desired effect of temperature compensation.

Let $R_5$ and $R_7$ be the values of these resistances at the reference temperature $t=0°$, and let $\alpha_5$ and $\alpha_7$ be their temperature coefficients respectively. We may denote $$f_0=\left(1+\frac{R_5}{r_2}\right)\left(1+\frac{R_6}{r_1}+\frac{R_6}{R_7}\right)$$

then at temperature $t=t°$, $$f_t=\left(1+\frac{R_5}{r_2}+\frac{R_5\alpha_5 t}{r_2}\right)\left(1+\frac{R_6}{r_1}+\frac{R_6}{R_7}-\frac{R_6\alpha_7 t}{R_7}\right)+F(t^2)$$

or $$f_t=f_0+\left[\left(1+\frac{R_6}{r_1}+\frac{R_6}{R_7}\right)\frac{R_5\alpha_5}{r_2}-\left(1+\frac{R_5}{r_2}\right)\frac{R_6\alpha_7}{R_7}\right]t+F_1(t^2)$$

where $F(t^2)$ and $F_1(t^2)$ are some quadratic functions of $t$.

Now, for optimum compensation, the first order term must vanish, that is $$\left(1+\frac{R_6}{r_1}+\frac{R_6}{R_7}\right)\frac{R_5\alpha_5}{r_2}=\left(1+\frac{R_5}{r_2}\right)\frac{R_6\alpha_7}{R_7}$$

giving $$\frac{\left(1+\frac{R_7}{R_6}+\frac{R_7}{r_1}\right)}{\left(1+\frac{r_2}{R_5}\right)}=\frac{\alpha_7}{\alpha_5}$$

and $$R_7=\left[\frac{\alpha_7}{\alpha_5}\left(1+\frac{r_2}{R_5}\right)-1\right]\left(\frac{r_1 R_6}{r_1+R_6}\right)$$

This formula gives the value of the shunt resistance $R_7$ for any particular moving coil of resistance $R_5$ which is to be temperature compensated. The values of $\alpha_7$, $r_1$ and $R_6$ are not quite arbitrary as they are governed by the condition that the ratio $i_2/i$ should be as large as possible in order to reduce the loss in the maximum sensitivity of the instrument.

Figure 2:
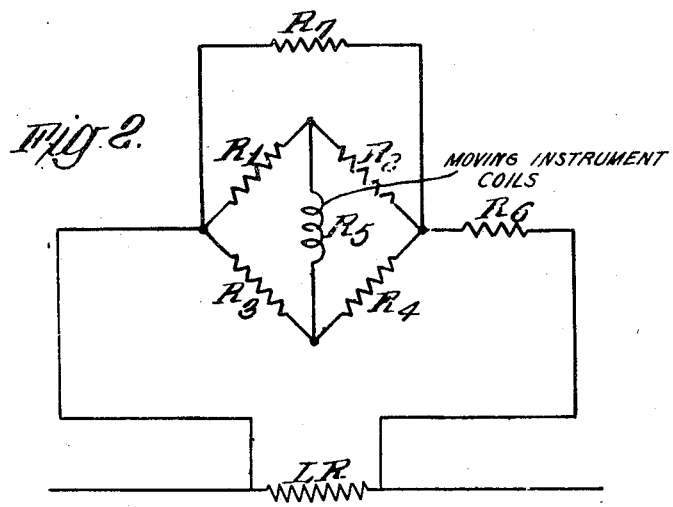
Fig. 2 shows the arrangement of Fig. 1 as an ammeter.

In Fig. 2 the arrangement of Fig. 1 is shown as an ammeter, the battery E of Fig. 1 being replaced by a low resistance shunt LR through which the current to be measured flows. Assuming that the coil $R_5$ is of copper ($\alpha_5=0.00393$ per 1° C.), the resistance $R_7$ is of nickel ($\alpha_7=0.0058$ per 1° C.) and that the resistances $$R_5=R_1=R_2=R_4=K,$$

$R_3=2K$, and $R_6=3K$, $R_7$ will equal $1.93K$. For these values the ratio $i_2/i$ is equal to $$\frac{i_2}{i_1}=\frac{R_2R_3-R_4R_1}{r_2R\left(1+\frac{R_5}{r_2}\right)\left(1+\frac{r_1}{R_7}\right)}=$$

$$\frac{(K.2K-K.K)}{1.2K.5K\left(1+\frac{K}{1.2K}\right)\left(1+\frac{1.2K}{1.93K}\right)}=\frac{1}{17.8}$$

Therefore, using this arrangement across a low resistance, which is small compared with the total resistance of the bridge circuit, we can obtain a temperature compensated instrument with a loss in the maximum sensitivity of only 1:18 which compares very favourably with instruments using a large swamping resistance.

The arrangement of the present invention is particularly valuable for use in the construction of a resistance thermometer using as an indicating instrument the 300° compensated ohmmeter described in U. S. Letters Patent to Smith, No. 2,409,963, granted October 22, 1946. In this instrument compensation for voltage fluctuations is effected by means of an electromagnet which controls the total flux in the air gap in which the coil moves.

In one circuit arrangement, described in the aforesaid patent, the moving coil is connected in a bridge circuit between a tapping on the winding of the compensating electromagnet and the join of two series connected resistances, one of which may be a fixed resistance and the other the bulb of a resistance thermometer. The ends of the compensating winding are joined with the terminals of a battery and respectively with the other ends of the fixed and temperature variable resistances.

With this voltage compensating arrangement of two magnetic fields acting on a single moving coil, the relation between the deflection of the moving coil and the battery voltage E is of the form $$c\theta=aE-bE^2$$

where $a$, $b$ and $c$ are constants depending on the intensity of magnetisation of the permanent magnet, the geometrical configuration of the instrument, and the mechanical properties of the hair-springs.

The right hand side of this relation represents the displacing torque on the moving coil, the first term being the contribution of the permanent magnetic field, and the second term that of the electromagnetic field which is in the opposite direction to the first. The left hand side represents the restoring torque due to the two hairsprings, placed at the opposite ends of the moving coil shaft, and this torque is directly proportional to the deflection $\theta$, from the central zero position.

As shown by this expression, the readings of the instrument (i. e. the deflection angle $\theta$) are not completely independent of the battery voltage E, as, for example, is the case with instruments of the crossed-coil and ratiometer types. In fact, the relation $\theta$ versus E may be written in the form $$\theta_v-\theta=\frac{\theta_v}{E_v^2}(E-E_v)^2$$

which represents a parabola, with its vertex uppermost and its axis parallel to the axis of $\theta$. This parabola is shown in Fig. 3. The constants $\theta_v$ and $E_v$ are the two coordinates of the vertex, and they are connected with the instrument constants $a$, $b$ and $c$, by means of the relations $$E_v=\frac{a}{2b} \text{ and } \theta_v=\frac{a^2}{4bc}$$

By the choice of suitable values for the constants $a$ and $b$, that is by adjusting the ratio of the permanent magnetic to the electromagnetic fields, the vertex of this parabola may be made to lie symmetrically with respect to the two limits $E_1$ and $E_2$ of a prescribed range of voltage variations, thus reducing to a minimum the variation in readings with changes in the voltage E. The shape of the parabola near its vertex is comparatively flat with respect to the voltage axis and this fact enables a satisfactory degree of compensation to be achieved for a normal range of voltage variations.

Now, changes in the ambient temperature cause changes in the resistance of both the control coil and the moving coil, since both of these are made of copper wire, and this has the effect of displacing the parabola $\theta$ vs. E with respect to its normal (i. e. room temperature) position, thus increasing the errors corresponding to the minimum variations in readings with changes in the voltage, that is corresponding to the region of the parabola near its vertex.

Changes in the resistance of the control coil have the effect of changing the ratio of the permanent magnetic to the electromagnetic field, and are responsible for displacements of the parabola along the voltage axis E, while changes in the resistance of the moving coil are responsible for displacements along the deflection axis $\theta$.

The errors due to the change in resistance of the moving coil of this instrument may be removed by the use of the present invention while those due to the change in resistance of the control coil may be reduced in practice to an acceptable figure by means of a special circuit arrangement.

Figure 4:
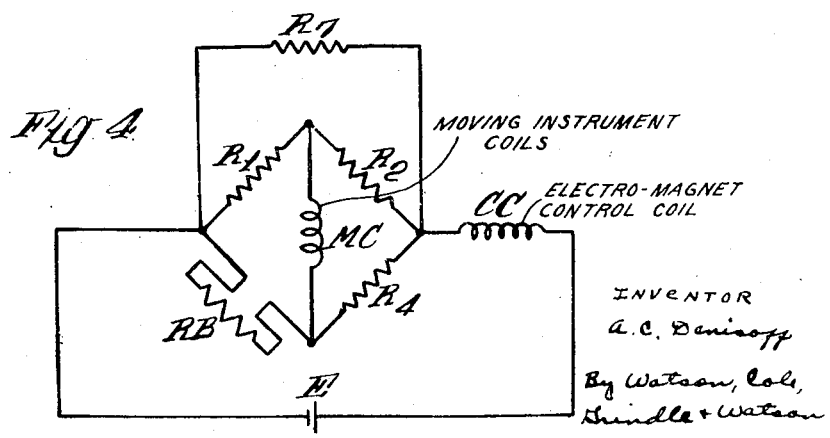
Fig. 4 shows an arrangement using this ohmmeter as a resistance thermometer.

Referring now to Fig. 4 there is shown the circuit of a resistance thermometer which uses the compensated ohmmeter described in the above mentioned Patent No. 2,409,963. This circuit is generally the same as that of Fig. 1 except that the control coil CC of the ohmmeter replaces the resistance $R_6$ of Fig. 1 while the resistance bulb RB of the thermometer, which includes a resistance having a high temperature coefficient of resistance, replaces the resistance $R_3$ of substantially zero coefficient. As in Fig. 1 the resistances $R_1$, $R_2$ and $R_4$ have a substantially zero temperature coefficient.

The resistance bulb RB which may be located at a distance and connected with the bridge by means of long leads, is exposed to the temperature to be measured and its changes in resistance control the current flowing through the moving coil MC of the ohmmeter.

The instrument is itself exposed to ambient temperature changes but may be compensated as follows. As regards changes in resistance of the moving coil MC complete compensation may be obtained by selecting $R_7$ to have a particular magnitude and temperature coefficient as described above with reference to Fig. 1. As regards changes in resistance of the control coil CC, such changes may in part be swamped by the resistance of the bridge connected in series with it. However, these changes in resistance operate to vary the total current supplied by the battery E and they are therefore equivalent to changes in potential of this battery. That is to say so far as the control coil is concerned changes in temperature at constant voltage and changes in voltage at constant temperature produce exactly the same results. It follows therefore that since the desired working temperature range will be known the resistance variations of the control coil and hence the equivalent voltage variation may be estimated. Accordingly if the ohmmeter is designed to give the desired compensation for a given range of battery voltage variations increased to include the voltage variation representing the temperature range over which the desired compensation is also to be obtained the instrument will be compensated for both temperature and voltage variations.

Although this compensation is not exact over the full range it is found in practice that in a particular instrument the required accuracy can be obtained over the full range of temperature and voltage variations normally specified for aircraft instruments.

The arrangement is easily adjusted to suit varying conditions of operation, for the bridge resistances $R_1$, $R_2$ and $R_4$ may be simply controlled to allow for variations in the resistance bulb, and also to regulate the total current consumption so that for a single size of control coil a correct value of flux may be obtained over a wide range of operating conditions.

The present invention thus provides an improved circuit arrangement for compensating a moving coil instrument against inaccuracies due to variations in temperature without too great a decrease in sensitivity, which may be used with any type of moving coil instrument. The invention also provides an improved resistance thermometer which is effectively compensated against change in temperature and changes in voltage of the supply battery.

In the above description and in the appendent claims the expression "arm" in connection with a bridge network is used to denote that part of the network connected between the terminals A and D, D and B, B and C, or C and A of Fig. 1 while the expression "diagonal arm" is used to denote that part of the network connected between the terminals A and B or C and D.

I claim:

1. A temperature compensating arrangement for an indicating instrument having a moving coil wound with wire having an appreciable temperature coefficient of resistance comprising a bridge network having four arms, each constituted by a resistance having a substantially zero temperature coefficient, and two diagonal arms, one constituted by the moving coil of the instrument and the other constituted by a source of potential in series with a resistance and a further resistance in parallel with the said source and the series resistance, said further resistance being of such magnitude and having such a temperature coefficient that the temperature coefficient of the circuit is substantially zero.

2. An electric resistance thermometer circuit comprising an indicating instrument compensated against the effects of changes in the ambient temperature having a moving coil and a fixed control coil for compensating the instrument against variation in potential of a source of E. M. F., a bridge network comprising four arms and two diagonal arms, three arms of which are constituted by resistances each having a substantially zero temperature coefficient and the fourth arm of which is constituted by a resistance having a large temperature coefficient, one of said diagonal arms being constituted by the moving coil of said instrument and the other arm being constituted by a source of E. M. F. and the control coil of said instrument in series and in shunt with the source and control coil a further resistance of such magnitude and temperature coefficient that the effects of temperature changes on the moving coil of said instrument are eliminated.

3. A temperature compensating arrangement for an indicating instrument having a moving coil wound with wire having an appreciable temperature coefficient of resistance, comprising a bridge network having four resistive arms and two diagonal arms, one diagonal arm being constituted by the moving coil of the instrument and the other diagonal arm comprising a resistance of such magnitude and temperature coefficient that the temperature coefficient of the network as a whole is substantially zero.

4. A temperature compensating arrangement for an indicating instrument having a moving coil wound with wire having an appreciable temperature coefficient of resistance, comprising a bridge network having four resistive arms and two diagonal arms, one diagonal arm being constituted by the moving coil of the instrument and the other diagonal arm being constituted by a source of potential in series with a resistance and a further resistance in parallel with the said source and the series resistance, said further resistance being of such magnitude and temperature coefficient that the temperature coefficient of the network as a whole is substantially zero.

5. A temperature compensating arrangement for an indicating instrument having a moving coil wound with wire having an appreciable temperature coefficient of resistance, comprising a bridge network having four arms, each constituted by a resistance having a substantially zero temperature coefficient, and two diagonal arms, one diagonal arm being constituted by the moving coil of the instrument and the other diagonal arm being constituted by a source of potential in series with a resistance having a substantially zero temperature coefficient and a further resistance in parallel with the said source and the series resistance, said further resistance having a positive temperature coefficient and a magnitude determined by the formula $$R = \left[\frac{\alpha_7}{\alpha_5}\left(1+\frac{r_2}{R_5}\right)-1\right]\left(\frac{r_1 R_6}{r_1+R_6}\right)$$

wherein $\alpha_7$ and $\alpha_5$ are the temperature coefficients of the said further resistance and of the moving coil respectively, $R_5$ is the resistance of the moving coil, $R_6$ is the resistance of the series resistance and $r_2$ and $r_1$ are the bridge resistance across said one diagonal arm and said other diagonal arm respectively.

ALEXANDER CONSTANTINE DENISOFF.

REFERENCES CITED

The following references are of record in the file of this patent:

UNITED STATES PATENTS

| Number | Name | Date |
|---|---|---|
| 1,193,076 | Schon | Aug. 1, 1916 |
| 1,667,624 | Corson et al. | Apr. 24, 1918 |
| 2,016,660 | Weeks | Oct. 8, 1935 |
| 2,175,890 | Glowatski | Oct. 10, 1939 |